United States Patent
Inagaki et al.

(10) Patent No.: US 11,414,547 B2
(45) Date of Patent: Aug. 16, 2022

(54) OIL MIST INHIBITOR, LUBRICANT CONTAINING SAME, AND OIL MIST REDUCTION METHOD

(71) Applicant: DOW TORAY CO., LTD., Tokyo (JP)

(72) Inventors: Hiroyuki Inagaki, Ichihara (JP); Keiichi Akinaga, Ichihara (JP); Naoji Kawamura, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 158 days.

(21) Appl. No.: 16/485,876

(22) PCT Filed: Jan. 19, 2018

(86) PCT No.: PCT/JP2018/001487
§ 371 (c)(1),
(2) Date: Sep. 10, 2019

(87) PCT Pub. No.: WO2018/150806
PCT Pub. Date: Aug. 23, 2018

(65) Prior Publication Data
US 2020/0056042 A1    Feb. 20, 2020

(30) Foreign Application Priority Data

Feb. 17, 2017 (JP) .............................. JP2017-028213

(51) Int. Cl.
*C08L 83/04* (2006.01)
*D06M 15/643* (2006.01)

(52) U.S. Cl.
CPC ........... *C08L 83/04* (2013.01); *D06M 15/643* (2013.01); *C08L 2205/025* (2013.01); *C08L 2207/324* (2013.01)

(58) Field of Classification Search
CPC ......... C08L 83/04; C08G 77/12; C08G 77/20; D06M 15/643
See application file for complete search history.

(56) References Cited

U.S. PATENT DOCUMENTS

| | | | |
|---|---|---|---|
| 3,030,305 A * | 4/1962 | Murray | C10M 7/00 508/136 |
| 4,105,569 A | 8/1978 | Crossfield | |
| 5,625,023 A | 4/1997 | Chung et al. | |
| 6,586,535 B1 | 6/2003 | Clark et al. | |
| 2003/0120000 A1 | 6/2003 | Clark et al. | |
| 2008/0058479 A1 * | 3/2008 | Schlitzer | C09D 183/04 525/478 |
| 2008/0058491 A1 | 3/2008 | Schlitzer et al. | |
| 2010/0166970 A1 | 7/2010 | Ekeland | |
| 2010/0310780 A1 | 12/2010 | Martin et al. | |
| 2011/0287267 A1 * | 11/2011 | Hori | C08G 77/10 428/447 |
| 2012/0156148 A1 | 6/2012 | Shikano et al. | |
| 2017/0218133 A1 | 8/2017 | Ihara | |

FOREIGN PATENT DOCUMENTS

| | | |
|---|---|---|
| EP | 3722805 A1 | 10/2020 |
| JP | H10158938 A | 6/1998 |
| JP | 2004501262 A | 1/2004 |
| JP | 2004501264 A | 1/2004 |
| JP | 2006336023 A | 12/2006 |
| JP | 2010502778 A | 1/2010 |
| JP | 2010528152 A | 8/2010 |
| JP | 2013503878 A | 2/2013 |
| JP | 2013249472 A | 12/2013 |
| JP | 2014055265 A | 3/2014 |
| JP | 2014088556 A | 5/2014 |
| JP | 2016027180 A | 2/2016 |
| WO | 2015198827 A1 | 12/2015 |

OTHER PUBLICATIONS

English translation of International Search Report for PCT/JP2018/001487 dated Apr. 3, 2018, 2 pages.
Machine assisted English translation of JPH10158938A obtained from https://patents.google.com on Nov. 12, 2019, 7 pages.
Machine assisted English translation of JP2014055265A obtained from https://patents.google.com on Nov. 12, 2019, 11 pages.
Machine assisted English translation of JP2016027180A obtained from https://patents.google.com on Nov. 12, 2019, 11 pages.

* cited by examiner

*Primary Examiner* — Kuo Liang Peng
(74) *Attorney, Agent, or Firm* — Warner Norcross + Judd LLP

(57) ABSTRACT

An oil containing an oil mist suppressant is provided herein. The oil can be a fiber treatment oil, spinning oil, or textile treatment oil. The oil mist suppressant suppresses the formation of oil mist from the oil during treatment using the oil. In general, the oil mist suppressant will not inhibit the purpose and effects of the oil treatment. A method of reducing oil mist using the oil mist suppressant is also provided herein. The oil mist suppressant is constituted by a silicone fluid composition. The silicone fluid composition is homogeneously miscible with a dimethylpolysiloxane oil having a kinematic viscosity of 10.0 mm$^2$/s at 25° C. The silicone fluid composition also has the property of increasing the maximum lamellar length of the dimethylpolysiloxane oil by at least 5% when 1.0% by mass of the silicone fluid composition is added thereto.

8 Claims, No Drawings

OIL MIST INHIBITOR, LUBRICANT CONTAINING SAME, AND OIL MIST REDUCTION METHOD

TECHNICAL FIELD

The present invention pertains to an oil mist suppressant for use in oils, and, more specifically, to an oil mist suppressant suitable for fiber treatment oils, spinning oils, and textile treatment oils, and to an oil containing the same and a method of reducing oil mist using the same.

BACKGROUND ART

Misting, the phenomenon wherein an applied coating agent disperses in the form of a mist or aerosol, is a known problem that occurs when using rotating elements such as rollers to apply a release coating agent or the like to a substrate as the result of the rotational movement of the rotating elements or the translational motion of the substrate. The mist and aerosol particles not only negatively affect manufacturing by contaminating the working environment, but may also present industrial health and safety hazards to workers working near the coating machine.

Similarly, cutting and grinding fluids used with drills and the like are subjected to shear forces by the workpiece or tool during use, and are physically atomized to produce fluid particles (oil mist) that hang in the air. While oil mists of large particle sizes will condense (reliquefy) within a comparatively short time, fine mists are released into the atmosphere before condensation can occur. As a result, the interior of the factory is contaminated by the dispersed oil, which is not only problematic for the working environment, but may also present industrial health and safety hazards for attendant workers.

In order to solve this problem, Patent Documents 1-4 propose silicone-based mist prevention agents for use in coating agents applied via rotating elements such as rollers; these mist prevention agents are capable of manifesting a certain degree of effectiveness in preventing the generation of mist by coating agents that will presumably be cured, or by rotating elements such as rollers. However, in the case of oil treatments of fibrous or stretchable substrates, such as fiber treatments, yarn treatments, and textile treatments, oil mist is produced by different forces than the rotational motion or translational motion as in the case of coating; thus, these mist prevention agents cannot effectively suppress the production of oil mist in such cases. In addition, oils generally have lower kinematic viscosity than coating agents and are not curable; thus, when added to oils used in oil treatments, especially fiber treatments and textile treatments, in which substrate penetration and immersion are desired, these mist prevention agents do not homogeneously mix therewith, and are thus incapable of effectively suppressing the formation of oil mist, resulting in the potential problem of inhibiting the treatment of the fibers or textile.

Meanwhile, Patent Documents 5 and 6 propose adding silicone particles to cutting fluids and the like to reduce oil mist. With this method, however, silicone particles are inevitably present in the oil, and the solid particles adhere to the substrate, thus inhibiting the treatment effects desired of the oil or resulting in non-uniform treatment or defective products due to the occurrence of pooling; thus, there are many industrial settings in which said oil mist prevention agents cannot be used in oils. Moreover, as in the case discussed above, these oil mist prevention agents cannot homogeneously mix with oils used for fiber treatments, yarn treatments, or textile treatments when added thereto, and thus are incapable of effectively suppressing the formation of oil mist.

For this reason, there is a demand for an oil mist suppressant that can be used without disadvantage in non-curable, low-kinematic-viscosity oils, especially oils used for fiber treatments, yarn treatments, and textile treatments, and is capable of effectively suppressing the formation of oil mist during such treatments.

Meanwhile, while Patent Document 7 discloses a personal care composition containing a viscous silicone fluid, the problem to be solved by and the effects of said silicone fluid are fundamentally different from oil treatment and oil mist suppression, and the document neither discloses nor suggests such problems whatsoever.

PRIOR ART LITERATURE

Patent Literature

[Patent Document 1] JP 2004-501262 A
[Patent Document 2] JP 2004-501264 A
[Patent Document 3] JP 2010-502778 A
[Patent Document 4] JP 2006-336023 A
[Patent Document 5] JP 2014-055265 A
[Patent Document 6] JP 2016-027180 A
[Patent Document 7] JP 2013-503878 A

SUMMARY OF INVENTION

Technical Problem

An object of the present invention is to provide an oil mist suppressant that, when added to an oil used in oil treatments wherein substrate penetration and immersion are desired, especially fiber treatments, yarn treatments, or textile treatments, effectively suppresses the formation of oil mist from the oil during treatment using the oil, and will not inhibit the purpose and effects of the oil treatment; as well as an oil containing the same, and a method of reducing oil mist using the same.

Solution to Problem

As the result of dedicated research toward solving the problem described above, the Inventors focused on the fact that the forces that causes oil mist formation from oils used in fiber treatments, yarn treatments, and textile treatments as described above fundamentally differ in action. Specifically, mist is formed by dispersed coating agent or atomized oil caused by rotational motion and translational motion in the case of rollers or the like, and by rotational and cutting shear stress in the case of drills or the like, whereas tensile stress (i.e., force pulling the oil perpendicularly away from the stretching direction) acts upon the oil in situations involving the treatment of fibrous, flexible fibers, yarn, or textiles, with the result that the oil is atomized and dispersed as oil mist by the tensile stress on the surface of the fibrous substrate before having a chance to penetrate the substrate. On the basis of these technical observations, the Inventors arrived at the novel idea of using a silicone fluid composition that is capable of imparting viscoelasticity to oils and is homogeneously miscible with oils as an oil mist suppressant.

On the basis of the newly discovered problem and solution described above, the Inventors discovered that the problem described above can be solved by using a silicone fluid composition that has the property of imparting viscoelasticity to an oil by mixing with the oil and effectively increasing the lamellar length of the oil as an oil mist suppressant, thereby arriving at the present invention. Specifically, the Inventors discovered that the problem described above can be effectively solved by using a silicone fluid composition having the following properties:

i) the property of increasing the maximum lamellar length of a dimethylpolysiloxane oil having a kinematic viscosity of 10.0 mm$^2$/s at 25° C. by at least 5% when 1.0% by mass of the silicone fluid composition is added to the dimethylpolysiloxane oil; and ii) the property of being homogeneously miscible with a dimethylpolysiloxane oil having a kinematic viscosity of 10.0 mm$^2$ at 25° C.

as an oil mist suppressant, thereby arriving at the present invention. Although a dimethylpolysiloxane oil having a kinematic viscosity of 10.0 mm$^2$/s at 25° C. in order to specify the properties of the silicone fluid composition for property i), it goes without saying that the oil mist suppressant according to the present invention effectively works with other oils as well.

Specifically, the present invention comprises the following aspects:

"[1] An oil mist suppressant constituted by a silicone fluid composition having the following properties i) and ii):

i) the property of increasing the maximum lamellar length of a dimethylpolysiloxane oil having a kinematic viscosity of 10.0 mm$^2$/s at 25° C. by at least 5% when 1.0% by mass of the silicone fluid composition is added to the dimethylpolysiloxane oil; and ii) the property of being homogeneously miscible with a dimethylpolysiloxane oil having a kinematic viscosity of 10.0 mm$^2$ at 25° C.

[2] The oil mist suppressant according to [1], wherein the maximum lamellar length is increased by 10-100% in property i) of the silicone fluid composition.

[3] The oil mist suppressant according to [1] or [2], used in a fiber treatment oil, spinning oil, or textile treatment oil.

[4] The oil mist suppressant according to any one of [1]-[3], wherein the silicone fluid composition contains:

(A) 1-100 parts by mass of a silicone compound selected from the group consisting of the following component (A1), component (A2), and component (A3), and mixtures of two or more thereof:

(A1) a branched organopolysiloxane comprising, within its molecule, one or more branched siloxane units selected from a T unit represented by R$^1$Si$_{1.5}$ (wherein R$^1$ is a monovalent hydrocarbon group optionally substituted with a halogen atom) and a Q unit represented by SiO$_{2.0}$, and a chained polysiloxane structure represented by (R$^2{}_2$SiO$_{1.0}$)$_n$ (wherein R$^2$ is a monovalent hydrocarbon group optionally substituted with a halogen atom, an alkoxy group, or a silanol group, and n is a number in a range of 2-1,000);

(A2) a cross-linkable organopolysiloxane obtained by reacting (a1) a cyclic or straight-chain organohydrogen polysiloxane and (a2) a polydimethylsiloxane comprising an alkenyl group at least on both ends of the molecular chain in the presence of a hydrosilylation catalyst so that the number of moles of alkenyl groups in component (a1) per 1 mole of hydrogen atoms bonded to silicon atoms in component (a2) is in a range of 0.9-1.2; and (A3) silicone rubber that has a kinematic viscosity of 1,000,000-20,000,000 mm$^2$/s or is plastic at 25° C.; and (B) 99-0 parts by mass of a nonpolar silicone oil (other than those equivalent to component (A1) or component (A2) described above) having a kinematic viscosity of 1-1,000 mm$^2$/s at 25° C.; and if the silicone fluid composition is a mixture of the silicone compound (A) and the nonpolar silicone oil (B), the two are homogeneously mixed.

[5] The oil mist suppressant according to [4], wherein the nonpolar silicone oil (B) is a chained or cyclic nonpolar silicone oil having a kinematic viscosity of 1-100 mm$^2$/s at 25° C.

[6] The oil mist suppressant according to [4] or [5], wherein the nonpolar silicone oil (B) is one or more selected from the group consisting of chained polydimethylsiloxane having a kinematic viscosity of 1-10 mm$^2$/s at 25° C., octamethylcyclotetrasiloxane, and decamethylcyclopentasiloxane.

[7] The use of a silicone fluid composition containing:

(A) 1-100 parts by mass of a silicone compound selected from the group consisting of the following component (A1), component (A2), and component (A3), and mixtures of two or more thereof:

(A1) a branched organopolysiloxane comprising, within its molecule, one or more branched siloxane units selected from a T unit represented by R$^1$SiO$_{1.5}$ (wherein R$^1$ is a monovalent hydrocarbon group optionally substituted with a halogen atom) and a Q unit represented by SiO$_{2.0}$, and a chained polysiloxane structure represented by (R$^2{}_2$SiO$_{1.0}$)$_n$ (wherein R$^2$ is a monovalent hydrocarbon group optionally substituted with a halogen atom, an alkoxy group, or a silanol group, and n is a number in a range of 2-1,000);

(A2) a cross-linkable organopolysiloxane obtained by reacting (a1) a cyclic or straight-chain organohydrogen polysiloxane and (a2) a polydimethylsiloxane comprising an alkenyl group at least on both ends of the molecular chain in the presence of a hydrosilylation catalyst so that the number of moles of alkenyl groups in component (a1) per 1 mole of hydrogen atoms bonded to silicon atoms in component (a2) is in a range of 0.9-1.2; and (A3) silicone rubber that has a kinematic viscosity of 1,000,000-20,000,000 mm$^2$/s or is plastic at 25° C.; and (B) 99-0 parts by mass of a nonpolar silicone oil (other than those equivalent to component (A1) or component (A2) described above) having a kinematic viscosity of 1-1,000 mm$^2$/s at 25° C.; and further characterized in that, if the silicone fluid composition is a mixture of the silicone compound (A) and the nonpolar silicone oil (B), the two are homogeneously mixed, and and the composition having the following properties i) and ii), as an oil mist suppressant:

i) the property of increasing the maximum lamellar length of a dimethylpolysiloxane oil having a kinematic viscosity of 10.0 mm$^2$/s at 25° C. by at least 5% when 1.0% by mass of the silicone fluid composition is added to the dimethylpolysiloxane oil; and ii) the property of being homogeneously miscible with a dimethylpolysiloxane oil having a kinematic viscosity of 10.0 mm$^2$ at 25° C.

[8] An oil containing the oil mist suppressant according to any one of [1]-[6].

[9] The oil according to [8], wherein the oil is a fiber treatment oil, spinning oil, or textile treatment oil.

[10] A method of reducing oil mist, the method including:
adding the oil mist suppressant according to any one of [1]-[6] to an oil; and
applying the oil to another substrate.

[11] The method of reducing oil mist according to [10], wherein the other substrate is fibers, yarn, or a textile."

Advantageous Effects of Invention

By using the oil mist suppressant according to the present invention in an oil for use in an oil treatment wherein substrate penetration and immersion are desired, especially fiber treatments, yarn treatments, and textile treatments, it is possible to effectively suppress the formation of oil mist from the oil during treatment using the oil without negatively affecting the purpose and effects of the oil treatment. It is also possible to provide an oil containing the oil mist suppressant according to the present invention, and a method of reducing oil mist using the same.

DESCRIPTION OF EMBODIMENTS

The silicone fluid composition constituting the oil mist suppressant according to the present invention will now be described. The silicone fluid composition has the property of imparting viscoelasticity to an oil by mixing with the oil and effectively increasing the maximum lamellar length of the oil; this yields the advantage that, when is added to an oil for use in a fiber treatment, yarn treatment, or textile treatment, the composition effectively suppresses the formation of oil mist by the action of tensile stress, etc., upon the oil, and not substantially inhibiting the purpose of the oil treatment and the effects of the treatment. As long as the required properties described above are met, a silicone compound can be used alone for the silicone fluid composition; however, for the sake of the miscibility with oils and ease of handling of the oil mist suppressant, it is also advantageous to use a silicone fluid composition constituted by a homogeneous mixture of a specific silicone compound that imparts viscoelasticity to oils with a nonpolar silicone oil that has a kinematic viscosity of 1-1,000 mm$^2$/s at 25° C. and has lower kinematic viscosity than the silicone compound.

[Property i): Oil Maximum Lamellar Length Increase Effect]

The first property of the silicone fluid composition is that it increases the maximum lamellar length of the oil with which it is mixed. This property can be objectively defined as the property of increasing the maximum lamellar length of a dimethylpolysiloxane oil having a kinematic viscosity of 10.0 mm$^2$/s at 25° C. (hereafter also referred to as the "standard dimethylpolysiloxane oil") by at least 5% when 1.0% by mass of the silicone fluid composition is added to the dimethylpolysiloxane oil, with the increase ($\Delta L$ %) in maximum lamellar length being defined as $$\Delta L\% = (L_1 - L_0)/L_0 \times 100(\%), \text{ wherein:}$$

($L_0$): the maximum lamellar length of the dimethylpolysiloxane oil having a kinematic viscosity of 10.0 mm$^2$/s at 25° C., and ($L_1$): the maximum lamellar length of the dimethylpolysiloxane oil having a kinematic viscosity of 10.0 mm$^2$/s at 25° C. after 1.0% by mass of the silicone fluid composition has been added thereto.

The lamellar length of the oil is the value as measured via a ring method using an automatic tensiometer or the like. There is no particular limitation upon the standard dimethylpolysiloxane oil as long as it is a dimethylpolysiloxane oil (standard product) having a kinematic viscosity of about 10.0 mm$^2$/s at 25° C.; dimethylpolysiloxane oils having viscosities of this standard (=kinematic viscosity of about 10.0 mm$^2$/s at 25° C.) are widely available on the market.

For example, if the maximum lamellar length of the standard dimethylpolysiloxane oil is 2.7 mm, and the maximum lamellar length of the dimethylpolysiloxane oil after a given silicone fluid composition has been added to the dimethylpolysiloxane oil to a concentration of 1.0% by mass is 3.5 mm, $\Delta L$ % can be calculated as $(3.5-2.7)/2.7 \times 100(\%) = 29.62(\%)$; a silicone fluid composition having this property will also have the effect of imparting viscoelasticity by increasing the maximum lamellar length, thereby suppressing oil mist, when added to oils other than the standard dimethylpolysiloxane oil. It goes without saying that, when using the silicone fluid composition as an oil mist suppressant, an amount other than 1.0% by mass can be added, depending on the type of oil to which it is to be added, or the desired oil mist suppressant effects.

In order to efficiently obtain oil mist suppressant effects, the amount by which the maximum lamellar length is increased, as determined via the method described above, is preferably 5-100%, more preferably 10-100%, and especially preferably 20-80%. If the increase in maximum lamellar length when 1.0% by mass of a given silicone fluid composition has been added to the standard dimethylpolysiloxane oil is less than 5%, the effect of imparting viscoelasticity to the oil will be insufficient, and it may be impossible to obtain sufficient oil mist suppressant effects. If the increase in the maximum lamellar length is too great, too much viscoelasticity will be imparted to the oil, and the desired treatment effect of the oil may be inhibited, depending on the type of oil and the treatment purpose; thus, it is preferable to carefully control the added amount. If the silicone fluid composition is insufficiently effective in imparting viscoelasticity to oils, viscoelasticity can be imparted to an oil by adding large quantities thereof to the oil; however, this is not desirable, as it is generally uneconomical to add large quantities of oil mist suppressant, and it may not be possible to sufficiently achieve the original purpose and treatment effects of the oil treatment if a large quantity is added.

The abovementioned property i) is an objective definition of a main property of the silicone fluid composition according to the present invention in terms of the increase in maximum lamellar length when a specific quantity (1.0% by mass) thereof is added to a standard dimethylpolysiloxane oil; a silicone fluid composition satisfying this property can be added in a quantity other than 1.0% by mass (for example, less than 1.0% by mass, or more than 1.0% by mass), or to a different oil, i.e., a silicone oil other than the standard dimethylpolysiloxane oil described above, a non-silicone oil, or a mixture thereof, without any limitation whatsoever. For example, a quantity other than 1.0% by mass may be added to one or more types of silicone oil having a different kinematic viscosity, or a quantity other than 1.0% by mass may be added to a liquid oil other than silicone oil (for example, a hydrocarbon oil, ester oil, higher alcohol, etc.), or a mixture thereof, without any limitation whatsoever.

[Property ii): Homogeneous Miscibility with Oils]

The second property of the silicone fluid composition is that it has at least a certain degree of homogeneous miscibility with oils. This property can be objectively defined as the property of homogeneously mixing when 1.0% by mass of the silicone fluid composition is added to a dimethylpolysiloxane oil having a kinematic viscosity of 10.0 mm$^2$/s at 25° C. In this context, "homogeneously mixing" means that the standard dimethylpolysiloxane oil and the silicone fluid composition form a substantially homogeneous phase through an ordinary mechanical means, such as stirring, or through diffusion between the liquid phases, and does not include cases in which solid matter or visible microparticulate gel or phase separation is present in the mixture. An inability on the part of the silicone fluid composition to form a substantially homogeneous phase when 1.0% by mass thereof is added to the standard dimethylpolysiloxane oil means that it will be incapable of sufficiently homogeneously mixing not only with the standard dimethylpolysiloxane oil, but with other oils as well. If such a silicone fluid composition were used as an oil mist suppressant, it would not sufficiently mix with oils, with the result that not only would insufficient viscoelasticity be imparted to the oil, but also that solid or gelled matter could form in the oil, or that the oil could separate, and, in particular, that the desired treatment effects could be inhibited if the composition were used in an oil used to treat fibers, yarn, or textiles. Moreover, insufficient mixing with the oil would degrade the ease of handling of the oil mist suppressant.

The abovementioned property ii) is an objective definition of a main property of the silicone fluid composition according to the present invention in terms of the presence or absence of homogeneous miscibility when a specific quantity (1.0% by mass) thereof is added to a standard dimethylpolysiloxane oil; a silicone fluid composition satisfying this property can be added in a quantity other than 1.0% by mass (for example, less than 1.0% by mass, or more than 1.0% by mass), or to a different oil, i.e., a silicone oil other than the standard dimethylpolysiloxane oil described above, a non-silicone oil, or a mixture thereof, without any limitation whatsoever. For example, even if the oil is less homogeneously miscible with the silicone fluid composition than the standard dimethylpolysiloxane oil, it may be capable of sufficiently homogeneously mixing with an added amount of less than 1.0% by mass that is capable of yielding the desired oil mist suppressant effects, in which case the silicone fluid composition constituting the oil mist suppressant according to the present invention is capable of yielding the technical effect of imparting viscoelasticity to the oil and suppressing oil mist.

For the sake of ease of handling, it is preferable that the silicone fluid composition according to the present invention be highly homogeneously miscible with oils. Specifically, it is preferable that the silicone fluid composition according to the present invention have the property that the standard dimethylpolysiloxane oil and the silicone fluid composition form a substantially homogeneous phase through ordinary mechanical means, such as stirring, or diffusion between the liquid phases, even if a quantity greater than 1.0% by mass, such as 5.0% by mass to 50.0% by mass (a substantially 1:1 mixture), is added to the standard dimethylpolysiloxane oil. A silicone fluid composition of this sort will generally have superior miscibility with oils other than the abovementioned standard dimethylpolysiloxane oil as well, and, in particular, can easily be added to a wide range of oils used to treat fibers, yarn, and textiles.

[Silicone Fluid Composition]

There is no particular limitation upon the type of the silicone fluid composition according to the present invention as long as it has the properties described above, and one or multiple types of silicone may be used; however, for the sake of the technical effects and ease of handling of the oil mist suppressant, it is preferable to use a specific single silicone compound having high viscoelasticity-imparting effects, or a homogeneous mixture of said silicone compound and a specific low-kinematic-viscosity nonpolar silicone oil. Specifically, a silicone compound having high viscoelasticity-imparting effects and comparatively low viscosity can be used in isolation. On the other hand, if the silicone compound having high viscoelasticity-imparting effects has high kinematic viscosity or insufficient fluidity, ease of handling when adding or miscibility with oils may decrease; but, by preparing a mixture thereof with a low-kinematic-viscosity nonpolar silicone oil in advance, the silicone fluid composition as a whole will be capable of yielding good technical effects and ease of handling on the part of the oil mist suppressant.

Specifically, the silicone fluid composition according to the present invention is characterized by containing:

(A) 1-100 parts by mass of a silicone compound selected from the group consisting of the following component (A1), component (A2), and component (A3), and mixtures of two or more thereof:

(A1) a branched organopolysiloxane comprising, within its molecule, one or more branched siloxane units selected from a T unit represented by $R^1SiO_{1.5}$ (wherein $R^1$ is a monovalent hydrocarbon group) and a Q unit represented by $SiO_{2.0}$, and a chained polysiloxane structure represented by $(R^2_2SiO_{1.0})_n$ (wherein $R^2$ is a monovalent hydrocarbon group optionally substituted with a halogen atom, an alkoxy group, or a silanol group, and n is a number in a range of 2-1,000);

(A2) a cross-linkable organopolysiloxane obtained by reacting (a1) a cyclic or straight-chain organohydrogen polysiloxane and (a2) a polydimethylsiloxane comprising an alkenyl group at least on both ends of the molecular chain in the presence of a hydrosilylation catalyst so that the number of moles of alkenyl groups in component (a1) per 1 mole of hydrogen atoms bonded to silicon atoms in component (a2) is in a range of 0.9-1.2; and (A3) silicone rubber that has a kinematic viscosity of 1,000,000-20,000,000 mm$^2$/s or is plastic at 25° C.;

and (B) 99-0 parts by mass of a nonpolar silicone oil (other than those equivalent to component (A1) or component (A2) described above) having a kinematic viscosity of 1-1,000 mm$^2$/s at 25° C.

Another characteristic is that, if the silicone fluid composition is a mixture of the silicone compound (A) and the nonpolar silicone oil (B), the two are homogeneously mixed.

[Silicone Compound (A)]

The component (A) described above is a silicone compound selected from component (A1), component (A2), component (A3), and mixtures of two or more thereof, and has the shared property of imparting viscoelasticity to an oil by increasing the maximum lamellar length thereof. As discussed above, these silicone compounds (A) can also be used singly. On the other hand, if these components generally have poor homogeneous miscibility with oils when used singly, or have extremely high kinematic viscosity, resulting in poor ease of handling of the oil mist suppressant, the components can be, and preferably are, used in the form of a mixture with a nonpolar silicone oil of low kinematic viscosity.

[(A1) Branched Organopolysiloxane]

Component (A1) is a branched organopolysiloxane comprising, within its molecule, one or more branched siloxane units selected from a T unit represented by $R^1SiO_{1.5}$ (wherein $R^1$ is a monovalent hydrocarbon group optionally substituted with a halogen atom) and a Q unit represented by SiO$_{2.0}$, and a chained polysiloxane structure represented by (R$^2_2$SiO$_{1.0}$)$_n$ (wherein R$^2$ is a monovalent hydrocarbon group optionally substituted with a halogen atom, an alkoxy group, or a silanol group, and n is a number in a range of 2-1,000), and is characterized by having a chained polysiloxane structure branched by a T-branch or Q-branch structure.

R$^1$ or R$^2$ in the formulas is a monovalent hydrocarbon group optionally substituted with a halogen atom, with preferred examples including an alkyl group comprising 1-12 carbon atoms, such as a methyl group, ethyl group, propyl group, butyl groups, pentyl group, hexyl group, heptyl group, octyl group, nonyl group, decyl group, undecyl group, or dodecyl group; an alkenyl group comprising 2-12 carbon atoms, such as a vinyl group, allyl group, or hexenyl group; an aryl group comprising 6-12 carbon atoms, such as a phenyl group, tolyl group, xylyl group, or naphthyl group; an aralkyl group comprising 7-12 carbon atoms, such as a benzyl group or phenethyl group; and halogen-substituted varieties of the aforementioned alkyl groups, such as a 3-chloropropyl group or 3,3,3-trifluoropropyl group; and a methyl group, phenyl group, or vinyl group being industrially preferable.

In the formula, n is the degree of polymerization of the (R$^2_2$SiO$_{1.0}$)$_n$ moiety representing the chained polysiloxane structure extending from the branched unit, and is preferably a number in a range of 2-1,000, especially preferably a number in a range of 2-500 or a number in a range of 100-300. At least two chained polysiloxane structures extending from the branched unit will be present in the same molecule, including when a cyclic structure is formed; however, if n exceeds the maximum stated above, kinematic viscosity will be too great, potentially reducing ease of handling.

A preferable component (A1) is a branched dimethylpolysiloxane in which the ends of the molecular chain are capped by trimethylsiloxy units (M units) or dimethylvinylsiloxy units (M$^{Vi}$ units), and that comprises one or more branched siloxane unit selected from Q units represented by one or more SiO$_{2.0}$ in its molecule, and preferably has a kinematic viscosity in a range of 1,000-100,000 mm$^2$/s at 25° C. In particular, if the kinematic viscosity of the component (A1) is in a range of 10,000-100,000 mm$^2$/s at 25° C., the component (A1) is preferably used singly, rather than in the form of a mixture with component (B), as this is useful for the sake of homogeneously mixing comparatively easily with oils and yielding the desired oil mist suppressant effects. If desired, the formation of a mixture with an oil is not excluded.

[(A2) Cross-Linkable Organopolysiloxane]

Component (A2) is a cross-linkable organopolysiloxane that yields a viscous silicone fluid, and is known in the art in technical fields other than oil mist suppressants (for example, see JP 2013-503878 A), but the use thereof as an oil mist suppressant is neither disclosed nor suggested therein, and the technical problem addressed thereby is different than in the present invention.

Component (A2) is a cross-linkable organopolysiloxane obtained by reacting (a1) a cyclic or straight-chain organohydrogen polysiloxane and (a2) a polydimethylsiloxane comprising an alkenyl group at least on both ends of the molecular chain in the presence of a hydrosilylation catalyst so that the number of moles of alkenyl groups in component (a1) per 1 mole of hydrogen atoms bonded to silicon atoms in component (a2) is in a range of 0.9-1.2; because the reaction ratio of alkenyl groups and hydrogen atoms bonded to silicon atoms on the ends of the molecular chain is near 1.0, the molecule as a whole has a finely cross-linked structure, and, despite being a cross-linkable organopolysiloxane, readily forms a homogeneous mixture with the nonpolar silicone oil constituting component (B), and has the advantage of being capable of effectively improving the viscoelasticity of the oil to which it is added.

Component (A2) is especially preferably a cross-linkable organopolysiloxane obtained by reacting the feedstock components (a1) and (a2) described above in the nonpolar silicone oil constituting component (B2) in the presence of a hydrosilylation catalyst so that the number of moles of alkenyl groups in component (a1) per 1 mole of hydrogen atoms bonded to silicon atoms in component (a2) is in a range of 0.9-1.2; effecting the cross-linking reaction in the nonpolar silicone oil in advance yields the advantage of dramatically improving the homogeneous miscibility of the obtained silicone fluid composition as a whole.

Component (a1) is a cyclic or straight-chain organohydrogen polysiloxane, and forms a cross-linked structure with component (a2) through a hydrosilylation reaction. This organohydrogen polysiloxane is preferably an organopolysiloxane comprising at least two hydrogen atoms bonded to silicon atoms per molecule. There is no particular limitation upon the position of the hydrogen atoms bonded to silicon atoms in component (a1); examples include at the ends of the molecular chain and/or on side chains of the molecular chain. Examples of organic groups bonded to silicon atoms in component (a1) include alkyl groups comprising 1-12 carbon atoms, such as methyl groups, ethyl groups, propyl groups, butyl groups, pentyl groups, hexyl groups, heptyl groups, octyl groups, nonyl groups, decyl groups, undecyl groups, or dodecyl groups; aryl groups comprising 6-12 carbon atoms, such as phenyl groups, tolyl groups, xylyl groups, and naphthyl groups; aralkyl groups comprising 7-12 carbon atoms, such as benzyl groups and phenethyl groups; and halogen-substituted varieties of the aforementioned alkyl groups, such as 3-chloropropyl groups and 3,3,3-trifluoropropyl groups; with methyl groups being preferable.

Component (a1) may be cyclic; examples include organohydrogen cyclosiloxanes comprising at least two hydrogen atoms bonded to silicon atoms on the siloxane ring, and having a siloxane polymerization level (g) of 3-8. Other preferable examples include methyl hydrogen cyclosiloxanes represented by formula [(CH$_3$)HSiO]$_{g1}$ (wherein g1 is a number in a range of 3-8) or formula [(CH$_2$)$_2$SiO]$_{g2}$ [(CH$_3$)HSiO]$_{g3}$ (wherein g2+g3 is a number in a range of 3-8, and g2 and g3 are each greater than 0).

Component (a1) may be chained, with examples including dimethyl hydrogen siloxy-group-capped dimethylpolysiloxane; dimethyl hydrogen siloxy-group-capped dimethylsiloxane/methyl hydrogen siloxane copolymer; trimethylsiloxy-group-capped methyl hydrogen polysiloxane; trimethylsiloxy-group-capped dimethylsiloxane/methyl hydrogen siloxane copolymer; and an organopolysiloxane comprising a siloxane unit represented by (CH$_3$)$_3$SiO$_{1/2}$, a siloxane unit represented by H(CH$_3$)$_2$SiO$_{1/2}$, and a siloxane unit represented by SiO$_{4/2}$; with a straight-chain methyl hydrogen polysiloxane being preferable.

Component (a2) is polydimethylsiloxane comprising alkenyl groups at least on both ends of the molecular chain, and is a component that, by virtue of comprising reaction points for component (a1) on both ends of the siloxane molecule, enables the engineering of a molecule having a long average siloxane chain length between cross-link points, and yields an overall moderate cross-link density in the obtained cross-linkable organopolysiloxane. The polydimethylsiloxane preferably only comprises about 0-2 alkenyl groups on the siloxane side chain, and, if the cross-linkable organopolysiloxane of the present invention is used as an oil mist suppressant, is preferably polydimethylsiloxane comprising substantially no alkenyl groups in the siloxane side chain. Preferred examples of alkenyl groups include alkenyl groups comprising 2-12 carbon atoms, such as vinyl groups, allyl groups, and hexenyl groups.

A preferable component (a2) can be selected from vinyl-functional-group-capped polydimethylsiloxane (vinyl siloxane) and hexenyl-functional-group-capped polydimethylsiloxane (hexenyl siloxane); in particular, the siloxane polymerization level of the polydimethylsiloxane moiety is preferably in a range of 50-200,000. More preferably, component (a2) can be selected from compounds comprising the formula $(CH_2=CH)Me_2SiO(Me_2SiO)_{dp}SiMe_2(CH=CH_2)$, wherein Me is a methyl group, and dp is the degree of polymerization. In one embodiment, dp is at least 50, preferably at least 4,000, and especially preferably at least 6,000 or at least 9,000.

The hydrosilylation catalyst is a catalyst that promotes cross-linking via a hydrosilylation reaction between component (a1) and component (a2), with examples including platinum catalysts, rhodium catalysts, and palladium catalysts, and platinum catalysts being preferable. Examples of platinum catalysts include finely powdered platinum, hexachloroplatinic acid, alcohol solutions of hexachloroplatinic acid, platinum-alkenylsiloxane complexes, platinum-olefin complexes, and platinum-carbonyl complexes, with platinum-alkenylsiloxane complexes being preferable. In particular, because this platinum-alkenylsiloxane complex has good stability, 1,3-divinyl-1,1,3,3-tetramethyldisiloxane is preferable. Non-platinum metal catalysts such as iron, ruthenium, and iron/cobalt may also be used as hydrosilylation-promoting catalysts.

The amount of hydrosilylation catalyst used is an amount that is effective for promoting a cross-linking reaction to obtain the cross-linkable organopolysiloxane. Specifically, an amount of metal catalyst in a range of 0.01-500 ppm, more preferably 0.01-100 ppm, especially preferably 0.01-50 ppm, per 100 parts by mass of the cross-linkable organopolysiloxane obtained as the sum of the masses of component (a1) and component (a2) is preferable.

Component (A2) of the present invention is characterized by being obtained by cross-linking the feedstock components (a1) and (a2) described above so that the number of moles of alkenyl groups (SiVi) in component (a1) per 1 mole of hydrogen atoms bonded to silicon atoms (SiH) in component (a2) is in a range of 0.9-1.2, preferably 0.95-1.15. The mass ratio represented by [SiVi]/[SiH] may be substantially around 1.0, and is most preferably engineered so as to be in a range of 1.0-1.15 so as to yield a slight excess of SiVi. This yields the advantage that, because substantially equal masses of the reactive functional groups in the cross-linkable organopolysiloxane are reacted, there are no residual excess reactive functional groups in the molecule that could cause oil degradation, etc.

Component (A2) of the present invention is preferably reacted in the nonpolar silicone oil (B) having a kinematic viscosity of 1-1,000 mm²/s at 25% described hereafter. In such cases, the feedstock components (a1) and (a2) may be subjected to a cross-linking reaction in component (B) in the presence of the hydrosilylation catalyst so that there is the desired concentration of the component (A2) yielded by the cross-linking reaction in the silicone fluid component (A), or the feedstock components (a1) and (a2) may be cross-linked in some of component (B), and additional component (B) added to the mixed composition containing component (A2). A composition constituted by these components (A2) and (B) is commercially available in the form of Dow Corning® 3901 Liquid Satin Blend, etc.

[(A3) Silicone Rubber]

Component (A3) is silicone rubber that has a kinematic viscosity of 1,000,000-20,000,000 mm²/s or is plastic at 25° C., and is a component that has an extremely high molecular weight, and thus imparts viscoelasticity to silicone fluid compositions in which it is included or oils to which it has been added, thus resulting in viscous behavior.

Silicone rubber is high-polymerization polydimethylsiloxane rubber constituted by dimethylsiloxy units (D units), and may comprise other reactive functional groups and branched units in its molecule. The ends of the molecular chain are preferably capped with trimethylsiloxy units (M units), dimethylvinylsiloxy units ($M^{Vi}$ units), or dimethylhydroxysiloxy units ($M^{OH}$ units). Such polydimethylsiloxane rubber has a molecular weight sufficient to impart a kinematic viscosity of at least 1,000,000 mm²/s at 25° C., or 2,000,000 mm²/s at 25° C., and may have a kinematic viscosity of 1,000,000-20,000,000 mm²/s at 25° C. Alternatively, the molecular weight of the polydimethylsiloxane rubber may be such that the polymerization level is extremely high, kinematic viscosity is difficult to measure, and the rubber is plastic. For example, the silicone rubber constituting component (A3) may have a molecular weight yielding a Williams plasticity of at least 40, and generally in a range of 40-200, as measured according to American Society for Testing And Materials (ASTM) D926.

The preparation of silicone rubber is known in the art, and numerous varieties are commercially available, such as DOW CORNING® 1501 FLUID.

[(B) Nonpolar Silicone Oil Constituting Carrier Fluid]

Component (B) functions as a carrier fluid for component (A), and may be, and preferably is, used as a solvent for the cross-linking reaction, like component (A2). Component (B) is a nonpolar silicone oil having a kinematic viscosity of 1-1,000 mm²/s at 25° C. Component (B) is different from component (A), as well as components (A1) and (A2). The nonpolar silicone oil may be volatile.

Examples of nonpolar silicone oils that are suitable for component (B) include volatile cyclic dimethylpolysiloxanes such as hexamethylcyclotrisiloxane (D3), octamethylcyclotetrasiloxane (D4), decamethylcyclopentasiloxane (D5), and dodecamethylcyclohexasiloxane (D6); and one or more of dimethylpolysiloxane capped at both ends with trimethylsiloxy groups, methylphenylpolysiloxane capped at both ends with trimethylsiloxy groups, copolymer of dimethylsiloxane capped at both ends with trimethylsiloxy groups and methylphenylsiloxane, diphenylpolysiloxane capped at both ends with trimethylsiloxy groups, copolymer of dimethylsiloxane capped at both ends with trimethylsiloxy groups and diphenylsiloxane, trimethylpentaphenyltrisiloxane, phenyl(trimethylsiloxy)siloxane, methylalkylpolysiloxane capped at both ends with trimethylsiloxy groups, copolymer of dimethylpolysiloxane capped at both ends with trimethylsiloxy groups and methylalkylsiloxane, copolymer of dimethylsiloxane capped at both ends with trimethylsiloxy groups and methyl(3,3,3-trifluoropropyl)siloxane, and α,ω-dihydroxypolydimethylsiloxane, any of which having a kinematic viscosity of 1-1,000 mm² at 25° C.

The nonpolar silicone oil constituting component (B) preferably does not comprise a reactive functional group, and, for industrial purposes, is preferably a chained or cyclic methylpolysiloxane having a kinematic viscosity of 1-1,000 mm$^2$/s at 25° C. As desired, the kinematic viscosity of the nonpolar silicone oil at 25° C. may be, and preferably is, within a range of 1-500 mm$^2$/s. For the sake of compatibility with component (A), ease of handling, and industrial productivity, one or more types of chained or cyclic nonpolar silicone oil having a kinematic viscosity of 1-100 mm$^2$/s at 25° C., selected from the group consisting of chained polydimethylsiloxane, octamethylcyclotetrasiloxane, and decamethylcyclopentasiloxane having a kinematic viscosity of 1-10 mm$^2$/s at 25° C., is the most preferable and inexpensive carrier fluid.

[Preferred Preparation of Silicone Fluid Composition]

The silicone fluid composition of the present invention may be component (A) alone, or a mixture of the silicone compound constituting component (A) and, as necessary, a nonpolar silicone oil carrier fluid constituting component (B). A mixture can be obtained by homogeneously mixing via mechanical force using an apparatus such as a homomixer, a paddle mixer, a Henschel mixer, a homodisper, a colloid mill, a propeller agitator, or a vacuum mixer, or by using component (B) as a reaction solvent and cross-linking reaction product carrier fluid to obtain a homogeneous mixture of the cross-linkable feedstock components, as in the case of component (A2).

For the sake of the ease of handling and technical effects of the oil mist suppressant, the abovementioned component (A1) having a kinematic viscosity of 10,000-100,000 mm$^2$/s at 25° C. may be used on its own as the silicone fluid composition if component (A) consists of component (A1) alone.

Meanwhile, if the silicone fluid composition according to the present invention is a mixture of the silicone compound constituting component (A) and the nonpolar silicone oil carrier fluid constituting component (B), there is no particular limitation upon the proportions thereof as long as the obtained silicone fluid composition is capable of manifesting the properties described above; however, for the sake of the ease of handling and technical effects of the oil mist suppressant, 5-20 parts by mass of component (A) and 95-80 parts by mass of component (B) is preferable, and 5-15 parts by mass of component (A) and 95-85 parts by mass of component (B) is more preferable. It is especially preferable that the silicone fluid composition of the present invention be the abovementioned mixture if component (A) is a silicone compound constituted by component (A2) or component (A3) described above.

While there is no particular limitation upon the kinematic viscosity of the silicone fluid composition, for the sake of the ease of handling and technical effects of the oil mist suppressant, 100-1,000,000 mm$^2$/s at 25° C. is preferable, and 500-1,500,000 mm$^2$/s is more preferable.

[Relationship with Thickening Properties]

The silicone fluid composition according to the present invention functions as an oil mist suppressant by homogeneously mixing with oils, and imparting viscoelasticity to the oil to which it is added. Meanwhile, while some known silicone-based mist suppressants have the effect of increasing kinematic viscosity simply by thickening the oil or coating agent, a suppressant lacking the effect of imparting viscoelasticity to an oil and increasing the maximum lamellar length thereof will be incapable of acting, or will be insufficient, as the oil mist suppressant that is the object of the present invention, even if the suppressant has thickening effects of this sort. In other words, oil thickening effects do not constitute the main technical means of solving the problem in the silicone fluid composition according to the present invention, and any change in oil viscosity is preferably slight.

[Use of the Silicone Fluid Composition as an Oil Mist Suppressant]

The present invention is characterized by the use of the silicone fluid composition described above as an oil mist suppressant. A preferred embodiment thereof, as discussed in connection with the silicone fluid described above, is the use of a silicone fluid composition containing:

(A) 1-100 parts by mass of a silicone compound selected from the group consisting of the following component (A1), component (A2), and component (A3), and mixtures of two or more thereof:

(A1) a branched organopolysiloxane comprising, within its molecule, one or more branched siloxane units selected from a T unit represented by $R^1SiO_{1.5}$ (wherein $R^1$ is a monovalent hydrocarbon group optionally substituted with a halogen atom) and a Q unit represented by $SiO_{2.0}$, and a chained polysiloxane structure represented by $(R^2{}_2SiO_{1.0})_n$ (wherein $R^2$ is a monovalent hydrocarbon group optionally substituted with a halogen atom, an alkoxy group, or a silanol group, and n is a number in a range of 2-1,000);

(A2) a cross-linkable organopolysiloxane obtained by reacting (a1) a cyclic or straight-chain organohydrogen polysiloxane and (a2) a polydimethylsiloxane comprising an alkenyl group at least on both ends of the molecular chain in the presence of a hydrosilylation catalyst so that the number of moles of alkenyl groups in component (a1) per 1 mole of hydrogen atoms bonded to silicon atoms in component (a2) is in a range of 0.9-1.2; and (A3) silicone rubber that has a kinematic viscosity of 1,000,000-20,000,000 mm$^2$/s or is plastic at 25° C.; and (B) 99-0 parts by mass of a nonpolar silicone oil (other than those equivalent to component (A1) or component (A2) described above) having a kinematic viscosity of 1-1,000 mm$^2$/s at 25° C.; and having the following properties i) and ii), as an oil mist suppressant. Another characteristic is that, if the silicone fluid composition is a mixture of the silicone compound (A) and the nonpolar silicone oil (B), the two are homogeneously mixed.

i) The property of increasing the maximum lamellar length of a dimethylpolysiloxane oil having a kinematic viscosity of 10.0 mm$^2$/s at 25° C. by at least 5% when 1.0% by mass of the silicone fluid composition is added to the dimethylpolysiloxane oil; and ii) the property of being homogeneously miscible with a dimethylpolysiloxane oil having a kinematic viscosity of 10.0 mm$^2$ at 25° C.

[Oil]

The present invention also provides an oil containing an oil mist suppressant constituted by the silicone fluid composition described above. There is no particular limitation upon the oils with which the oil mist suppressant according to the present invention may be used, the present invention is especially for use with a fiber treatment oil, spinning oil, or textile treatment oil. Such oils tend to be subjected to tensile stress and tearing stress during treatment, and the use of the oil mist suppressant according to the present invention yields the benefit of enabling very effective suppression of oil mist formation during the treatment process.

More specifically, the invention is an oil mist suppressant for spinning oils used to produce fibers, wherein force acts upon the oil during the oil treatment used during spinning. The base oil of the oil may be any base oil that is ordinarily used for such purposes, and may be a single type or a mixture of two or more types of oil. Examples include natural animal and vegetable oils and fats, semi-synthetic oils, hydrocarbon oils, polyglycols, phenyl ethers, ester oils, silicone oils, and fluorine-based oils. A silicone oil or ester oil having a kinematic viscosity of 1-1,000 mm$^2$/s at 25° C. is especially preferable. For industrial purposes, polydimethylsiloxane having a kinematic viscosity of 1-1,000 mm$^2$/s at 25° C. is preferable; one type or a mixture of two or more types may be used.

Non-limiting examples of the type of fibers treated by the oil containing the oil mist suppressant include polyester elastic fibers, polyamide elastic fibers, polyolefin elastic fibers, and polyurethane elastic fibers.

The amount of the oil mist suppressant according to the present invention added to the oil is preferably 0.001-10% by mass, more preferably 0.01-3% by mass. Adding an amount of the oil mist suppressant that exceeds the maximum will not necessarily improve oil mist suppressant effects any further. The addition of an amount that is less than the minimum may not result in sufficient oil mist suppressant effects, and is uneconomical besides. The oil may be prepared according to known methods without any particular limitation. Any method of oil-treating fibers, yarn, textiles, etc., that is known to a person skilled in the art may be used without any particular limitation.

Known additives may be included in the oil, as necessary. Examples of such additives include organic modified silicone oils other than the silicone compound of the present invention, silicone resins, oiliness agents, extreme pressure additives, organic acid salts, antioxidants, lubricants, film thickeners, rust inhibitors, anti-foaming agents, metal deactivators, binders typified by non-ionic surfactants and higher alcohols, antistatic agents typified by ionic surfactants, wetting agents, UV absorbers, antioxidants, leveling agents, antistatic agents, and preservatives. An oil mist suppressant constituted by a high-molecular-weight organic compound can be included in the oil to the extent that the effects of the present invention are not inhibited. The added amount of additives may be adjusted, as appropriate, according to known methods to the extent that the effects of the present invention are not inhibited.

EXAMPLES

The oil mist suppressant and oil containing the same according to the present invention will now be described in greater detail with the use of examples.

(Oil Maximum Lamellar Length)
The maximum lamellar length (unit: mm) of the oil with and without the addition of various oil mist suppressants was measured using an automatic tensiometer (KRUSS model K12) at 25° C. using a platinum ring having a radius of 9.545 mm and a wire diameter of 0.27 mm. The platinum ring pulling speed was 3 mm/min.

(Kinematic Viscosity)
The viscosity (kinematic viscosity) of the oil with and without the addition of various oil mist suppressants was measured at room temperature (25° C.) using an Ubbelohde capillary kinematic viscometer.

Oil mist suppressant evaluation was performed by evaluating the following silicone fluid compositions (hereafter referred to as "oil mist suppressants").

Silicone fluid composition No. 1: Dow Corning® 3901 Liquid Satin Blend (mixture of (b1) dimethylpolysiloxane (2 mm$^2$/s) with (a2) finely cross-linkable organopolysiloxane; paste-like composition containing about 6% by mass of component (a2))

Silicone fluid composition No. 2: Dow Corning® 1501 fluid (mixture of (b2) decamethylpentacyclosiloxane with (a3) plastic silicone rubber; liquid composition containing about 15% by mass of component (a3))

Silicone fluid composition No. 3: branched dimethylpolysiloxane (kinematic viscosity: 40,000 mm$^2$/s) having a structure branched by (a1) a Q unit ($SiO_{4/2}$), and having a structure capped at both ends with vinylmethylsiloxy groups Silicone fluid composition No. 4: Dow Corning® 9040 elastomer blend (mixture of (b2) decamethylpentacyclosiloxane with 1,4-hexadiene-crosslinked dimethylpolysiloxane; paste-like composition containing about 12% by mass of the cross-linked product (solids))

Silicone fluid composition No. 5: Polyether-modified finely cross-linkable organopolysiloxane (kinematic viscosity: 10,000 mm$^2$/s)

Examples 1-3 and Comparative Example 1

(Evaluation Method)
The various silicone fluid compositions described above were added to the oils listed below in the concentrations (% by mass) listed in Table 1 and Table 2 and homogeneously mixed, and the maximum lamellar lengths before and after said addition were measured. Dimethylpolysiloxane oil having a kinematic viscosity of 10.0 mm$^2$/s at 25° C. is used as a standard dimethylpolysiloxane oil in the present invention; in Table 1, a concentration of 0% by mass represents the maximum lamellar length ($L_0$) of the oil itself before the silicone fluid composition is added thereto. A rating of "X" indicates that the silicone fluid composition did not homogeneously mix with the oil. Dimethylpolysiloxane oils having kinematic viscosities of 10.0 mm$^2$/s, 100.0 mm$^2$/s, and 1,000.0 mm$^2$/s at 25° C. are widely available on the market from Dow Corning Toray and other manufacturers.

Silicone oil (10 mm$^2$/s): dimethylpolysiloxane oil having kinematic viscosity of 10.0 mm$^2$/s at 25° C. (=standard dimethylpolysiloxane oil)

Silicone oil (100 mm$^2$/s): dimethylpolysiloxane oil having kinematic viscosity of 100.0 mm$^2$/s at 25° C.

Silicone oil (1,000 mm$^2$/s): dimethylpolysiloxane oil having kinematic viscosity of 1,000.0 mm$^2$/s at 25° C.

TABLE 1

| Examples Comparative Examples | Oil | Oil mist suppressant (silicone fluid composition) | Quantity Added (% by mass) | Maximum lamellar length (L) mm | Increase in maximum lamellar length (ΔL %) |
|---|---|---|---|---|---|
| — | Silicone oil (10 mm$^2$/s) | — | 0 | 2.7 ($L_0$) | — |
| Example 1-1-1 | | No. 1 | 1.0 | 4.2 | 55.6 |
| Example 1-1-2 | | | 0.5 | 4.3 | 59.3 |

TABLE 1-continued

| Examples Comparative Examples | Oil | Oil mist suppressant (silicone fluid composition) | Quantity Added (% by mass) | Maximum lamellar length (L) mm | Increase in maximum lamellar length (ΔL %) |
|---|---|---|---|---|---|
| Example 1-1-3 | | | 0.1 | 3.6 | 33.3 |
| Example 1-1-4 | | | 3.0 | 4.0 | 48.2 |
| Example 1-1-5 | | | 0.01 | 3.0 | 11.1 |
| Example 1-2-1 | | No. 2 | 1.0 | 4.2 | 55.6 |
| Example 1-3-1 | | No. 3 | 1.0 | 5.2 | 92.6 |
| Comparative Example 1-1 | | No. 4 | 1.0 | 2.7 | 0.0 |
| Comparative Example 1-2 | | No. 5 | 1.0 | X | — |

TABLE 2

| Example | Oil | Oil mist suppressant (silicone fluid composition) | Quantity Added (% by mass) | Maximum lamellar length (L) mm | Increase in maximum lamellar length (ΔL %) |
|---|---|---|---|---|---|
| — | Silicone oil (100 mm²/s) | — | 0 | 3.3 ($L_0$) | — |
| Example 2-1 | | No. 1 | 1.0 | 3.7 | 12.1 |
| — | Silicone oil (1,000 mm²/s) | — | 0 | 3.2 ($L_0$) | — |
| Example 3-1 | | No. 1 | 1.0 | 3.4 | 6.3 |

The oil mist suppressant according to the present invention has the property of increasing the maximum lamellar length of the standard dimethylpolysiloxane oil used in the present invention by at least 5%, as attested by Examples 1-1-1, 1-2-1, and 1-3-1, and the property of increasing maximum lamellar length when added to other oils as well, as attested by Examples 2-1 and 3-1. The oil mist suppressant also has the property of increasing the maximum lamellar length of an oil even when added in different amounts thereto, as attested by Examples 1-1-2 through 1-1-5. In all cases, the change in the kinematic viscosity of the oil was slight, and there was no major change in the ease of handling of the oil after the addition of the suppressant. Accordingly, the oil mist suppressant according to the present invention, when added in the desired amount to various types of oil, can be expected to be capable of imparting viscoelasticity to the oil and effectively suppressing the formation of oil mist by the action of tensile stress upon the oil, without negatively affecting the ease of handling or treatment effects of the oil.

Meanwhile, as attested by Comparative Examples 1-1 and 1-2, other silicone fluid compositions either failed entirely to increase the maximum lamellar length of the oil, or were not miscible therewith. Thus, these components either do not function as suppressants of oil mist formed by tensile stress, or do not homogeneously mix with oils, and thus may potentially negatively affect the desired oil treatment.

What is claimed is:

1. An oil containing an oil mist suppressant, the oil mist suppressant constituted by a silicone fluid composition having the following properties i) and ii):
   i) the property of increasing the maximum lamellar length of a dimethylpolysiloxane oil having a kinematic viscosity of 10.0 mm²/s at 25° C. by at least 5% when 1.0% by mass of the silicone fluid composition is added to the dimethylpolysiloxane oil; and
   ii) the property of being homogeneously miscible with a dimethylpolysiloxane oil having a kinematic viscosity of 10.0 mm² at 25° C.;
   wherein the oil is a fiber treatment oil, spinning oil, or textile treatment oil;
   wherein the silicone fluid composition comprises:
   (A) 1-100 parts by mass of a silicone compound, where the silicone compound (A) comprises:
      (A2) a cross-linkable organopolysiloxane obtained by reacting;
         (a1) a cyclic or straight-chain organohydrogen polysiloxane, and
         (a2) a polydimethylsiloxane comprising an alkenyl group at least on both ends of the molecular chain, in the presence of a hydrosilylation catalyst so that the number of moles of alkenyl groups in component (a2) per 1 mole of hydrogen atoms bonded to silicon atoms in component (a1) is in a range of 0.9-1.2; and
   (B) 99-0 parts by mass of a nonpolar silicone oil, other than those equivalent to component (A2), and having a kinematic viscosity of 1-1,000 mm²/s at 25° C.; and
   wherein if the silicone fluid composition is a mixture of the silicone compound (A) and the nonpolar silicone oil (B), the two are homogeneously mixed.

2. The oil according to claim 1, wherein the maximum lamellar length is increased by 10-100% in property i) of the silicone fluid composition.

3. The oil according to claim 1, wherein the nonpolar silicone oil (B) is a chained or cyclic nonpolar silicone oil having a kinematic viscosity of 1-100 mm²/s at 25° C.

4. The oil according to claim 1, wherein the nonpolar silicone oil (B) is one or more selected from the group consisting of chained polydimethylsiloxane having a kinematic viscosity of 1-10 mm$^2$/s at 25° C., octamethylcyclotetrasiloxane, and decamethylcyclopentasiloxane.

5. A method of reducing oil mist, the method including:
applying an oil to fibers, yarn, or a textile;
wherein the oil is according to claim 1.

6. The method of reducing oil mist according to claim 5, wherein the maximum lamellar length is increased by 10-100% in property i) of the silicone fluid composition.

7. The method according to claim 5, wherein the nonpolar silicone oil (B) is a chained or cyclic nonpolar silicone oil having a kinematic viscosity of 1-100 mm$^2$/s at 25° C.

8. The method according to claim 5, wherein the nonpolar silicone oil (B) is one or more selected from the group consisting of chained polydimethylsiloxane having a kinematic viscosity of 1-10 mm$^2$/s at 25° C., octamethylcyclotetrasiloxane, and decamethylcyclopentasiloxane.

* * * * *